United States Patent

[11] 3,591,819

| [72] | Inventor | Nikolaus Laing<br>Hofener Weg 35-37, 7141 Aldingen,<br>Germany |
|---|---|---|
| [21] | Appl. No. | 804,630 |
| [22] | Filed | Mar. 5, 1969 |
| [45] | Patented | July 6, 1971 |
| [32] | Priority | Mar. 7, 1968 |
| [33] | | Switzerland |
| [31] | | 3430/68 |

[54] MULTIPLE-POLE ROTATING ELECTRICAL MACHINES
8 Claims, 21 Drawing Figs.

[52] U.S. Cl. .................................................. 310/217,
310/180, 310/259, 310/264
[51] Int. Cl. .................................................... H02k 1/06
[50] Field of Search............................................. 310/180,
216, 217, 218, 182, 185, 187, 188, 193, 191, 208,
211, 267, 269, 259, 254, 268, 266, 42

[56] References Cited
UNITED STATES PATENTS

| 2,528,023 | 10/1950 | VanLijf | 310/254 |
|---|---|---|---|
| 2,557,249 | 6/1951 | Aske | 310/42 |
| 2,501,222 | 3/1950 | Hybler | 310/259 |
| 1,255,607 | 2/1918 | Hensley | 310/217 X |
| 1,756,672 | 4/1930 | Barr | 310/217 X |
| 3,243,623 | 3/1966 | Hart | 310/216 |
| 2,977,490 | 3/1961 | Sherer | 310/172 |
| 3,207,935 | 9/1965 | Mosovsky | 310/216 X |
| 3,320,451 | 5/1967 | Wiley | 310/216 X |
| 2,192,073 | 2/1940 | Giskes | 310/156 |
| 1,408,890 | 3/1922 | Kimble | 310/217 UX |
| 2,469,808 | 5/1949 | Aske | 310/217 UX |
| 2,864,017 | 12/1958 | Waltscheff | 310/211 X |

FOREIGN PATENTS

| 97,659 | 11/1958 | Denmark | 310/180 |

*Primary Examiner*—Milton D. Hirshfield
*Assistant Examiner*—B. A. Reynolds
*Attorney*—Pennie, Edmonds, Morton, Taylor and Adams ABSTRACT: The poles of a multiple-pole rotating electrical machine take the form of discrete elements which can be so moved along the length of coil channels bounded by the poles that all the poles together form a pole ring in which at least every other pole is identical. The winding for a pole ring of this kind is embodied by one or more meandering continuous coils. To form the pole ring, a prefabricated winding comprising one or more meandering continuous coils is inserted into a channel bounded by one set of poles after which a further set of poles are pushed axially into contact with the first set to form a pole ring. These meandering coils can be used in axial split-casing motors. The meandering coils are produced in an apparatus having arms which move radially towards a center and which have at their ends grippers rotatable through 90°. As a final feature, annular lamination groups used in rotating electrical machines are produced from coiled metal strips.

INVENTOR
Nikolaus Laing
BY
ATTORNEYS

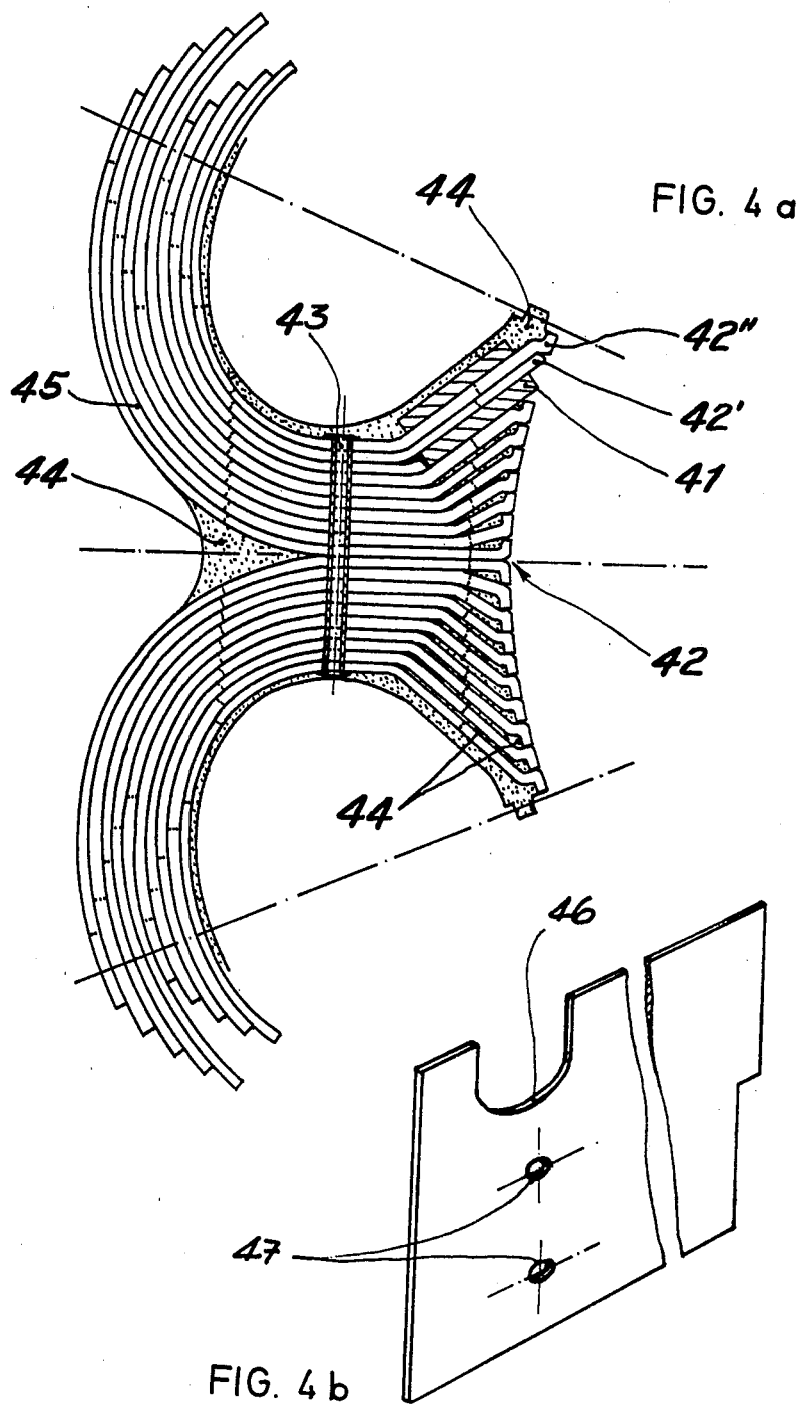

INVENTOR
Nikolaus Laing
BY
ATTORNEYS

MULTIPLE-POLE ROTATING ELECTRICAL MACHINES

THE PRIOR ART

All rotating electrical machinery has ferromagnetic components—the rotors of DC machines and the stators of induction machines—whose magnetization must be reversed at a high frequency. As a rule, the magnetization of induction machine rotors is reversed at low frequencies. Blanked laminations are used for the cores of these components and are layered or laminated in the form of lamination groups. Very complicated cutting tools are needed to produce these blanked laminations and spoilage in cutting is considerable. Since the cross sections of the pole piece returns which form the magnetic shunt decrease as the number of poles of the machine increases, the percentage of spoilage, and therefore the iron wastage, increases, as the number of poles of an induction motor increases.

Another disadvantage of using groups of laminations for the components of rotating electrical machinery is that the axial dimensions of such components are considerably greater than the axial length of the soft-iron cores, since the coil heads project beyond the axial ends of the cores.

Another disadvantage of known multiple-pole rotating electrical machines is that they need at least as many discrete continuous coils as there are poles. Since each winding has to be insulated manually and each coil has at least two exposed wire ends which must be wired up electrically, it has so far proved almost impossible to automatic winding and wiring-up.

DESCRIPTION OF THE INVENTION

The invention relates to a soft-iron core construction, of use in rotating electrical machines, such that metal sheets, in the form of industrial rolls of strip, can be used with very little wastage.

The invention also relates to soft-iron cores so devised that they can receive windings substantially within the limits defined by the overall axial length of the cores.

The invention also relates to coils which can be used for winding stators and rotors and which can be preshaped and which enable components of rotating electrical machinery to be wound with reduced labor and with a saving of copper.

To obviate these disadvantages, the invention provides a multiple-pole rotating electrical machine, more particularly a split-phase motor, whose rotor and/or stator comprise a soft-iron core and a winding, the core having poles extending towards the air gap between the rotor and the stator, characterized in that adjacent poles are formed by separate elements which can be so joined together by being pushed into one another axially of the core so that all the poles together form a pole ring in which every other pole is identical.

Subdividing the pole rings into a number of separate elements enables the various poles to be produced from blanked laminations which are substantially rectangular, so that the sheet iron can be used up almost completely. The rectangular blanked laminations are curved in one direction and so layered in groups as to form the poles with the pole shoes which have the required cross sections in planes perpendicular to the pole-ring axis; the lamination edges which form the pole shoes extend, in the poles combined from the separate elements, substantially parallel to this pole-ring axis.

Preferably, the complete winding takes the form of one or more meander-shaped continuous coils so introduced into the winding slots or channels between the poles that, when the pole ring is put together, the poles can be slid into adjacent meander loops from two different directions. The rotor and/or stator winding can therefore be prefabricated, the component windings or coils being wound, insulated and given a meandering shape beforehand. In the simplest case each of these meander-shaped component windings has only two electrical connections, thus eliminating the complicated and labor-consuming work of wiring-up necessary in known rotating electrical machinery having one piece poles.

According to the invention, the curved laminations forming the poles can be formed at the axial ends with recesses for the coil heads so that the same do not project beyond the axial extent of the iron core.

Preferably, to reduce the saturation in the air gap between the rotor and the stator, those arms of the blanked laminations which form the pole shoes are spread; advantageously in this case, the arm ends near the air gap are raised so as to bound the air gap, the arms being closely adjacent one another.

Advantageously, in an embodiment wherein the poles are formed separately from the pole-piece returns forming the magnetic shunt, the magnetic return is formed by a lamination group comprising a coiled metal strip. An annular lamination group of this kind made from a coiled metal strip can be devised to receive any winding, so that this embodiment of a soft-iron core made from a coiled metal strip is also of use for the armature of a rotating electrical machine according to this invention. Constructing a lamination group from a coiled metal strip leads to maximum use of soft-iron material as is used in the construction of lamination groups for electrical machines.

The invention will be described by way of example with reference to the drawings, wherein:

FIG. 4a is a view to an enlarged scale of an alternative form of a pole for a stator of the kind shown in FIG. 1;

FIG. 4b is a perspective view of a blanked lamination for a lamination group used to form the pole shown in FIG. 4a;

FIG. 6b shows a partial development along the line VI–VI of FIG. 6a;

FIG. 13b is a view on the line XIII–XIII of FIG. 13a, and

Figure 1:
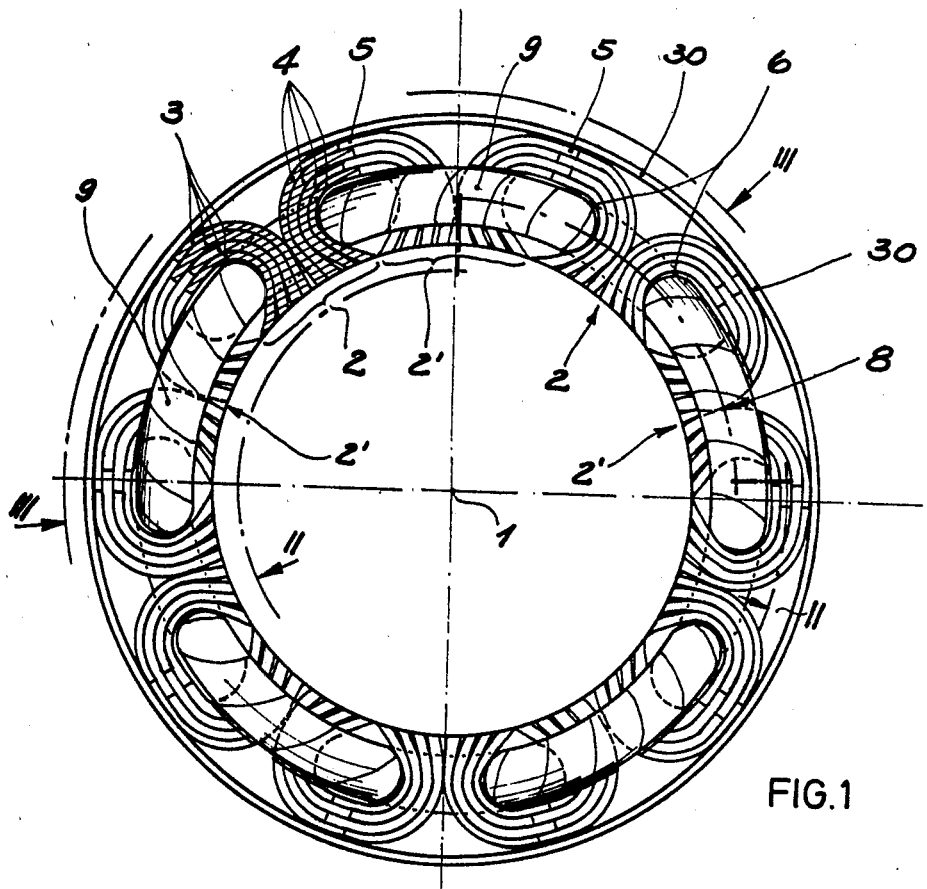
FIG. 1 is a plan view of the stator of a 10-pole induction motor according to the invention.
Figure 2:
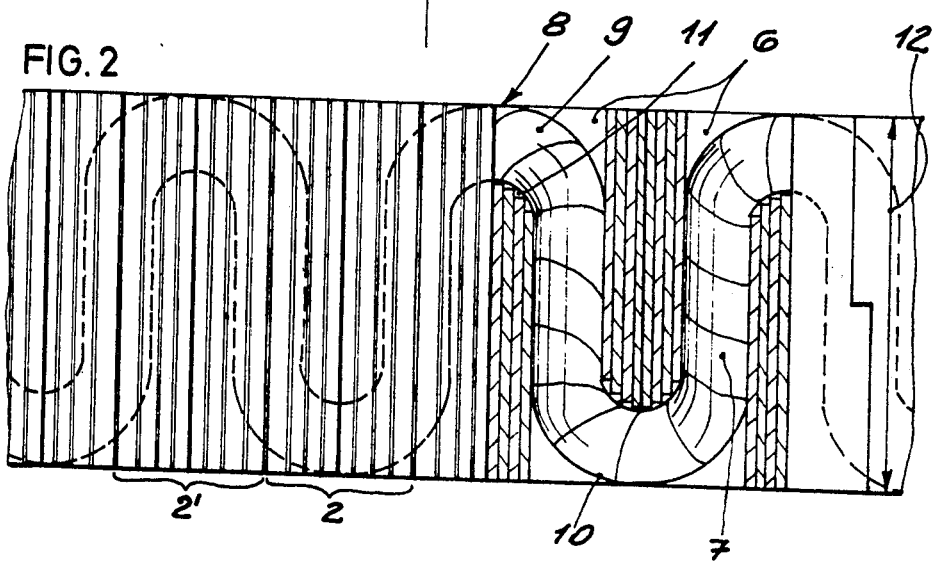
FIG. 2 is a partial development, along the line 11–11 of FIG. 1, of the stator shown therein.
Figure 3B:
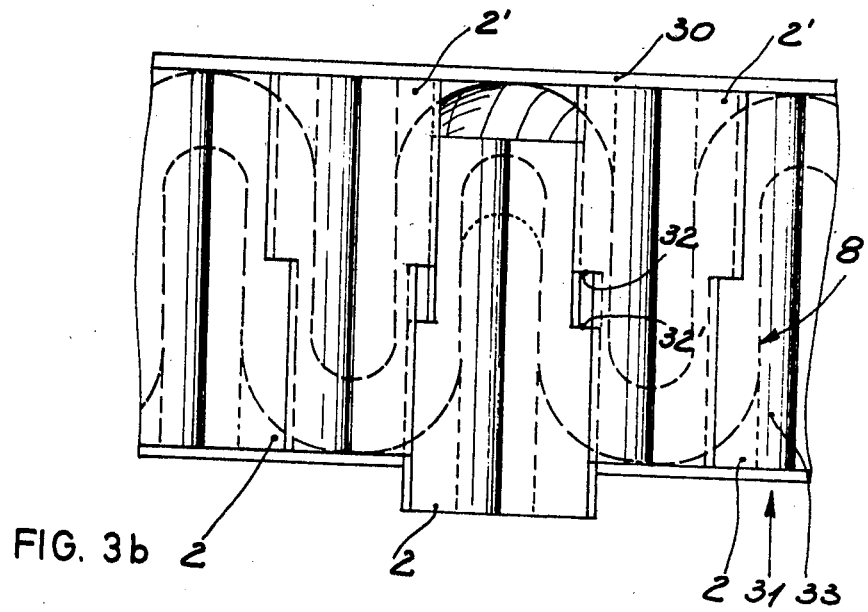
FIG. 3b shows a partial development along the line III–III of FIG. 1.
Figure 3A:
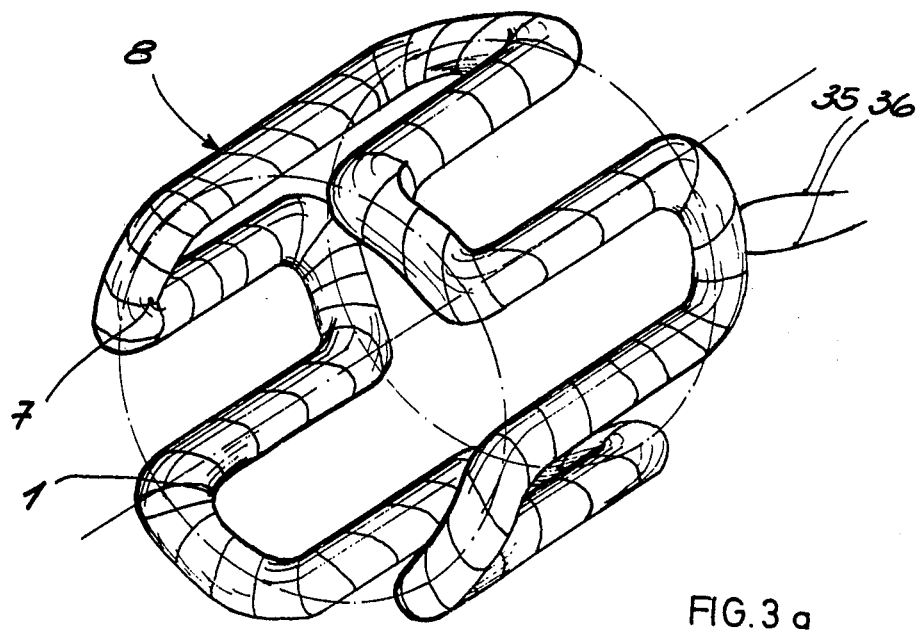
FIG. 3a shows the finished meandercoil for the stator of an eight-pole motor similar to the one shown in FIG. 1.

FIGS. 1, 2 and 3b show the stator of a 10-pole split-field motor. Each pole 2 comprises a unit made up of eight rectangular laminations arranged in two groups 3, 4 of four laminations each with the laminations of each group being curved in opposite directions. The pole 2 as shown in FIG. 1 is marked with fine hatching and the adjacent pole 2' is constructed similarly to that of pole 2. All the laminations are produced from rectangular blanks. Adjacent poles 2, 2' so mesh with one another peripherally at points 5 that the poles can be moved relatively to one another parallel to the axis 1 of the pole ring. Winding slots 6 form zones 7, which are parallel to the axis, of a meandering continuous coil 8 whose coil heads 9, 10 are received in recesses 11 so that the axial length 12 coincides substantially with the axial length of the pole ring and therefore with the axial length of the motor. FIG. 3a is a perspective view of a meandering coil for an eight-pole motor. When the stator is assembled, the poles 2 are first connected to the casing 30, whereafter the coil 8 is introduced in the direction indicated by an arrow 31. After introduction of coil 8, the poles 2' are introduced, also in the direction indicated by the arrow 31, until abutments 32, 32' engage with one another. In FIG. 3b merely one pole 2 is shown not fully introduced. After stator assembly, all that remains to be done is to wire up the two electrical connections 35, 36 of coil 8.

FIG. 4a shows a pole 42 which is constructed of rectangular blanked laminations similarly to the poles 2, 2' of FIG. 1. Each pole comprises a unit made up of 20 blanked laminations 45, one of which is shown in a perspective view in FIG. 4b. The laminations are held together by hollow rivets 43 which extend through rivet holes 47, the laminations being interconnected by synthetic resin fillings 44. As FIG. 4b shows, the blanks are formed with recesses 46 to receive the meander coil.

A short circuit winding 41 in the form of a piece of rectangular tube extends around two laminations 45', 42', to provide a split-phase effect to determine the hand of rotor rotation.

Figure 5A:
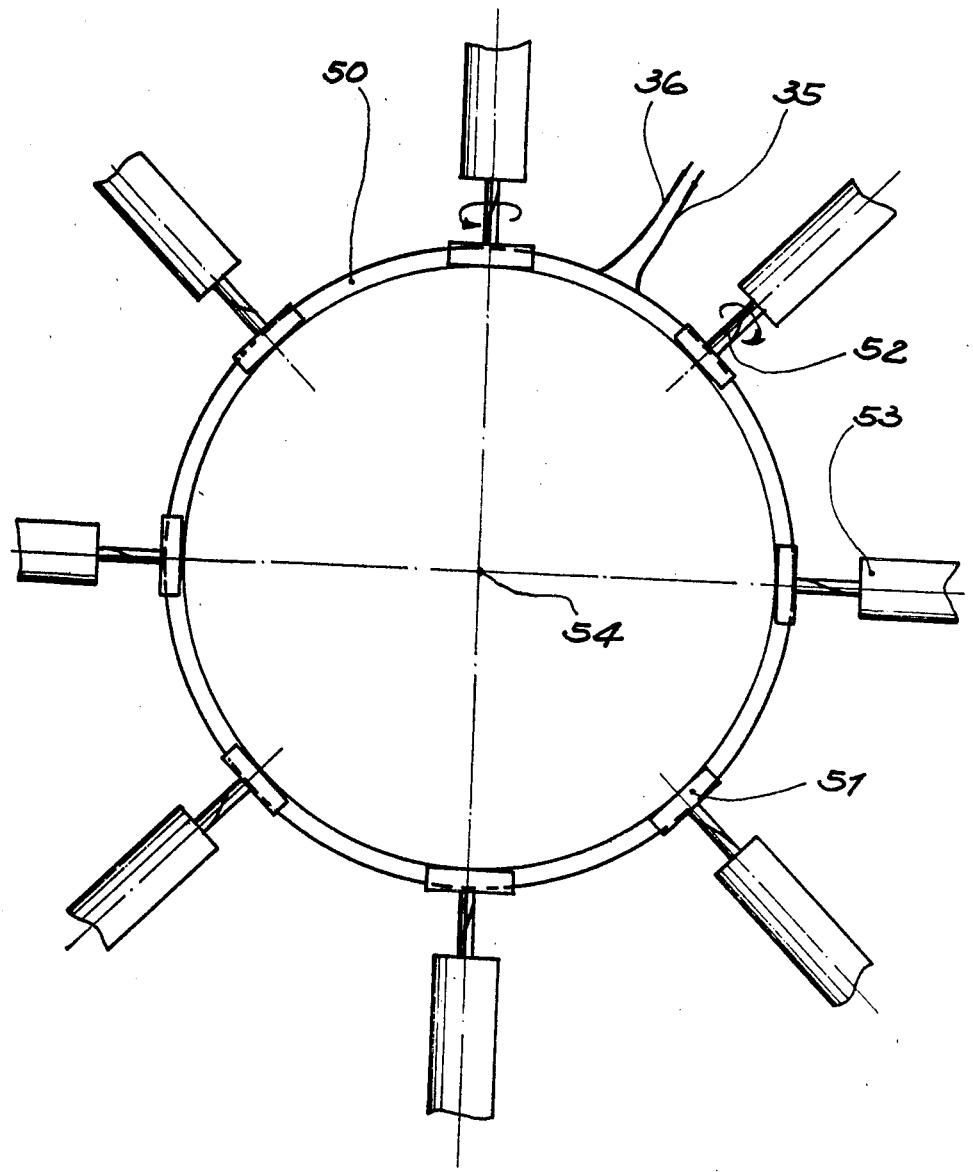
FIG. 5a is a diagrammatic view of an apparatus for shaping the meander winding or coil, the same being shown inserted but unshaped.
Figure 5B:
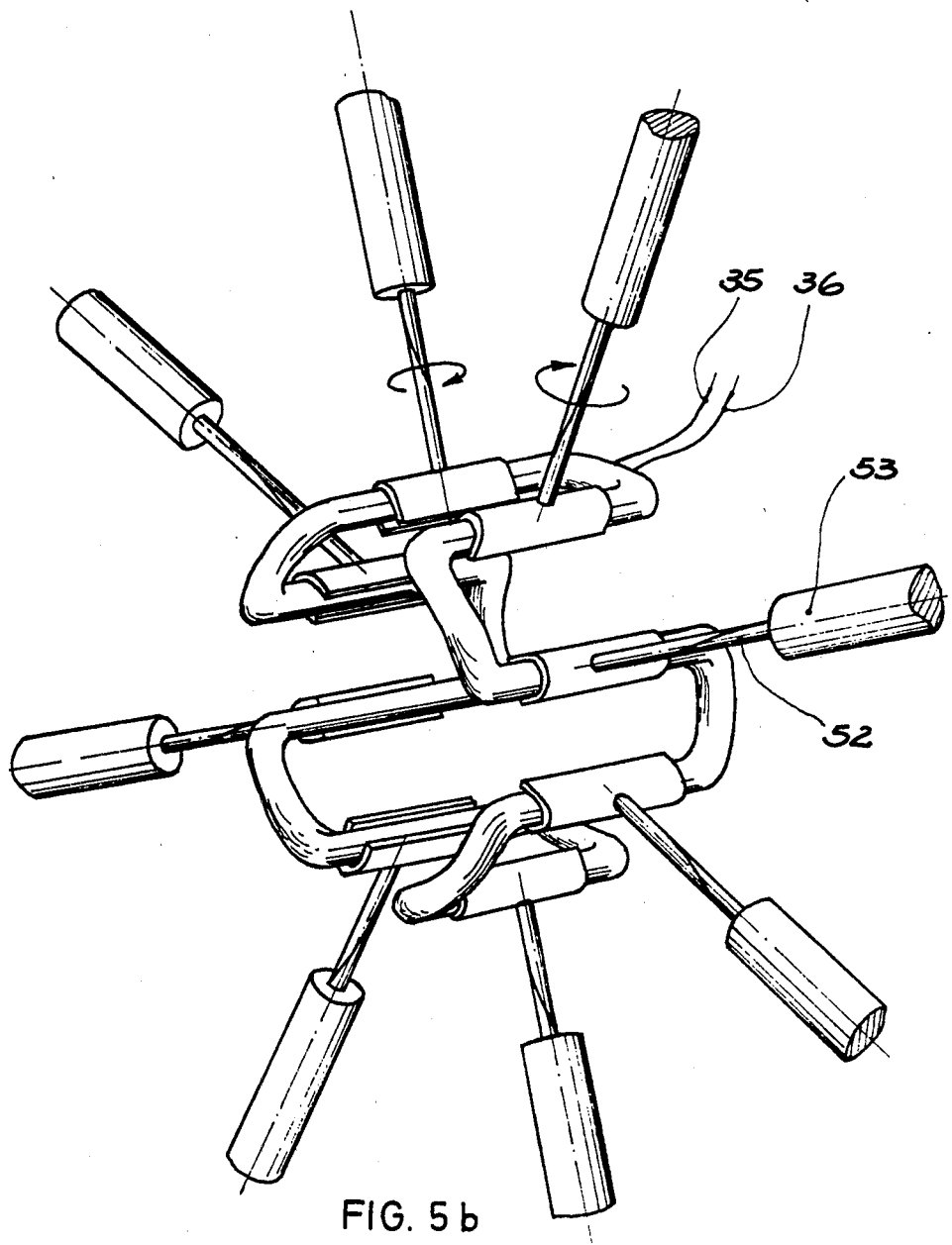
FIG. 5b shows the apparatus of FIG. 5a in a position in which the meander winding or coil has been shaped.

FIGS. 5a and 5b are diagrammatic views of an apparatus for producing meander coils. Production starts from a ring coil 50 which has been, for instance, conventionally insulated so that no linings are required in the stator winding slots. To shape the meander coil of an eight-pole motor, an apparatus is required having eight gripping jaws 51 disposed at the ends of push rods 52 which are disposed in cylinders 53 for movement towards a center 54 and which are rotatable around the axes of the rods 52. The coil 50 is bent to a meandering shape in a single step and simultaneously brought to the diameter of the pole ring. FIG. 5b shows the shaped meander coil of an eight-pole motor having only two connections 35, 36.

Figure 6A:
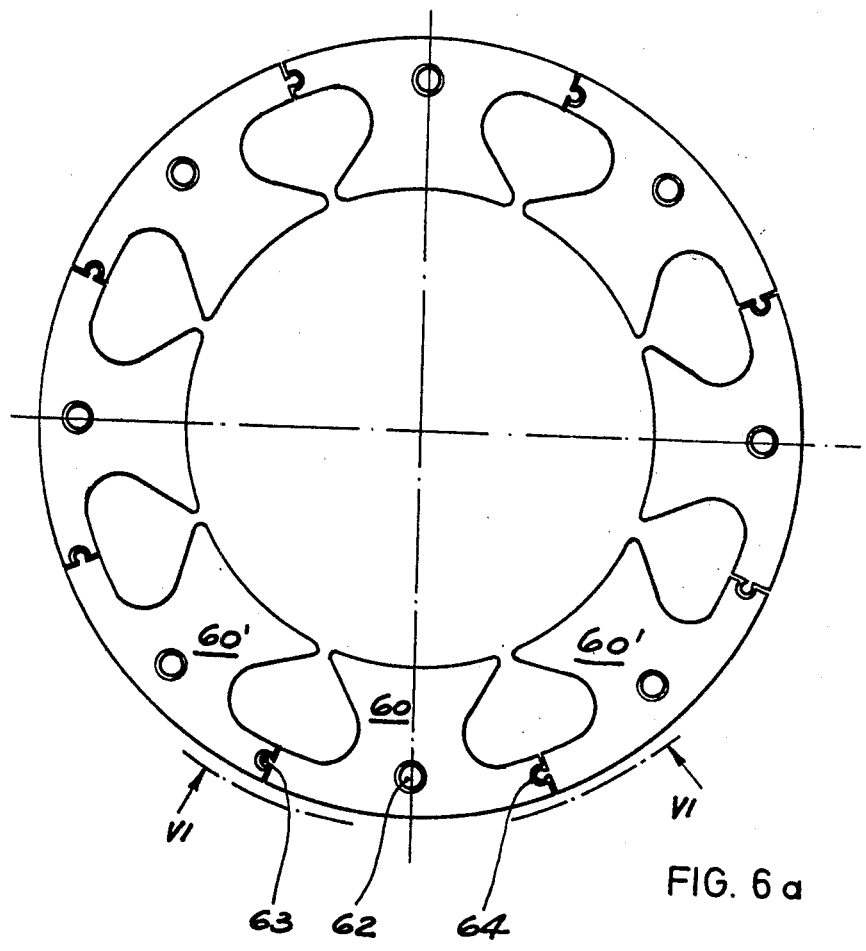
FIG. 6a is a plan view of another embodiment according to the invention of a stator of a rotating electrical machine having separate poles.

FIG. 6a is a plan view of a pole ring of a four-pole motor having poles 60 built up from punched-out laminations 61 which are stacked axially to form groups of laminations and held together by a hollow rivet 62. The various poles 60 have round fillets 63 at one end of the pole-piece return forming the shunt and are formed with grooves 64 congruent with the fillets 63 so that the poles can be pushed into one another axially. As can be seen in FIG. 6b, which is a developed view on the line VI-VI of FIG. 6a, the laminations 61 used for the poles 60 are curved axially, the curvatures of the laminations of adjacent poles 60, 60' facing in opposite directions, so that the coil heads 71, 71' of a meander coil can be placed in the resulting concavities 70, 70' and the axial length of the coil can therefore be substantially equal to the axial length of the lamination group.

Figure 7:
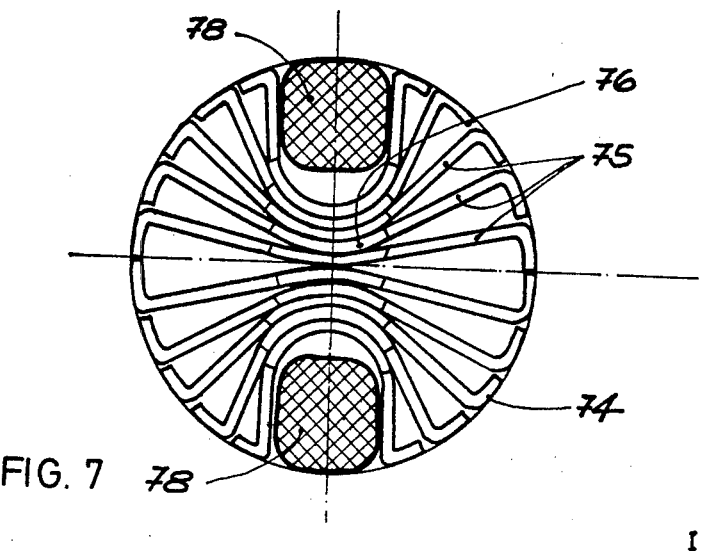
FIG. 7 is a plan view of a stator of an external-rotor motor according to the invention.
Figure 6:
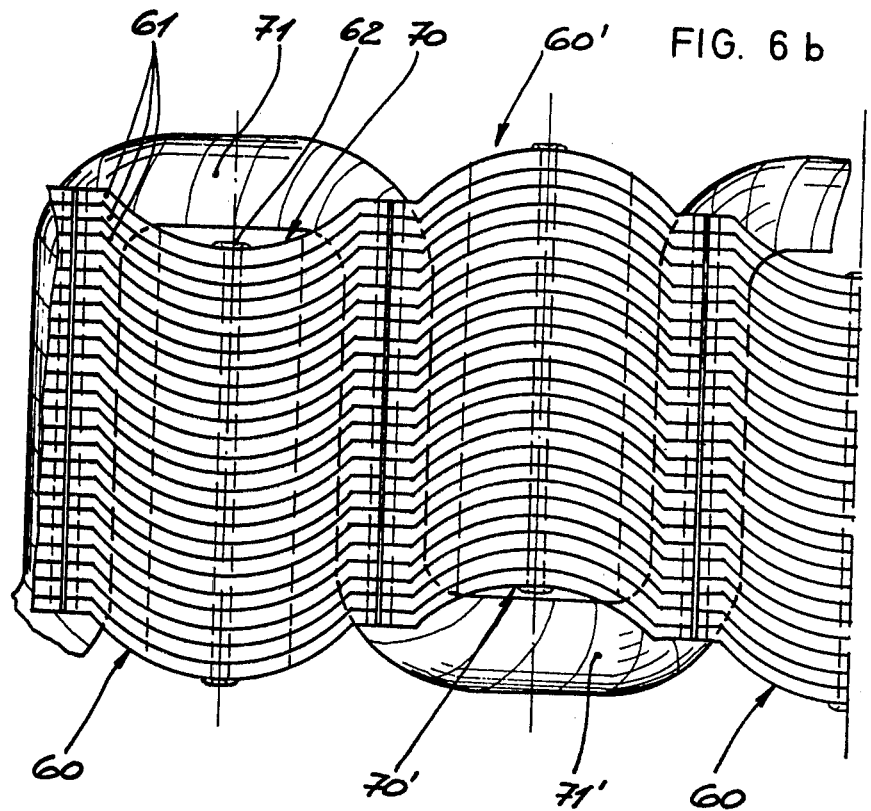

FIG. 7 is a plan view showing part of an electrical machine, such as an armature or stator of an external-rotor type motor. Outer edges 74 of curved laminations 75 are bent substantially at right-angles to ensure uniform low saturation in the air gap. The various laminations are formed with recesses acting as grooves 76 for the coil heads of a winding 78 (shown sectioned in FIG. 7), so that in this embodiment too the heads of the coil 78 do not project beyond the axial end of the soft-iron core.

Figure 8:
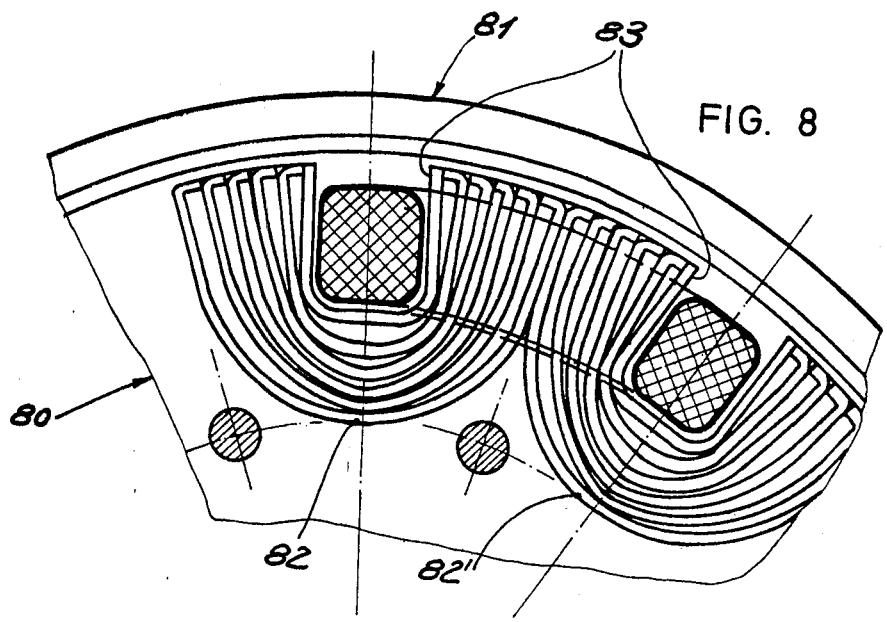
FIG. 8 is a plan view showing part of another embodiment of a stator of an external-rotor motor according to the invention.

FIG. 8 shows a segment of stator 80 of an external-rotor motor whose stator 81 has horseshoe-shaped poles 82, 82'. In this embodiment two grooves 83 for the coil heads are in the form of recesses in the laminations. Short circuit coils are provided but not shown. The meander coil is introduced into the grooves bounded by the horseshoe poles 82, 82'. To locate the poles, the two sides of the laminations can be formed with grooves engaged by projections on the motor bearing plate.

Figure 9:
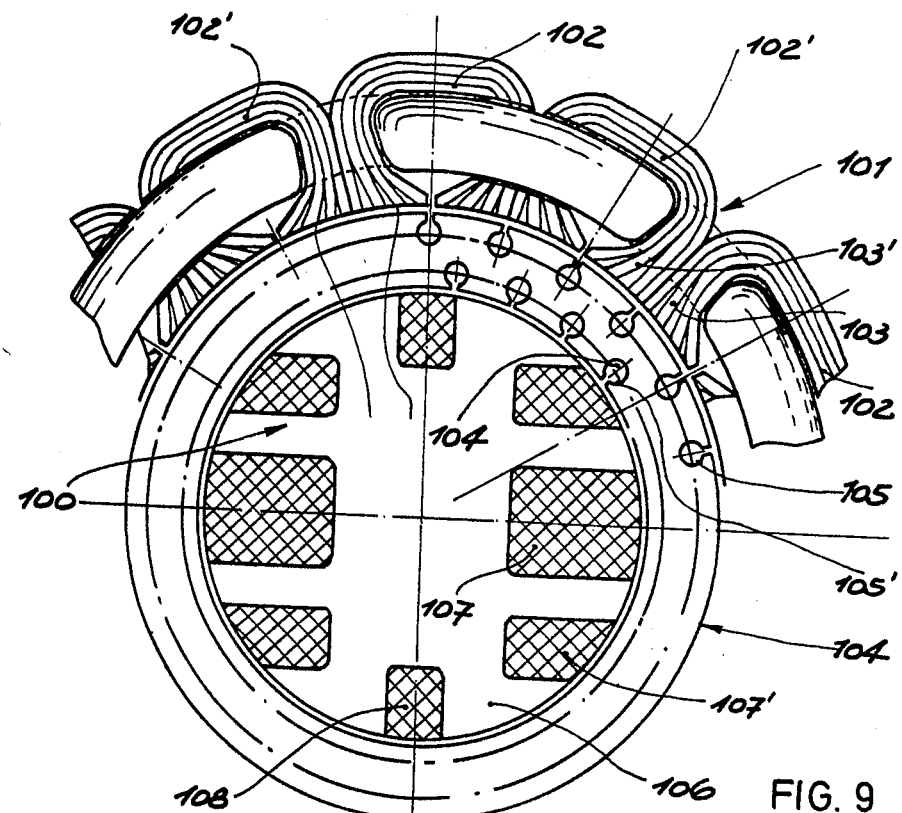
FIG. 9 is a plan view of a motor according to the invention having a ring rotor and an inner stator and outer stator, only part of the outer stator being shown.

FIG. 9 shows a motor according to the invention which has two stators 100, 101. The outer stator 101 has ten poles and 20 horseshoe-shaped soft-iron members 102, 102'. Arms 103, 103' of adjacent members 102, 102' cooperate to form a pole. Rotor 104 is formed on its inside and outside with recesses 105, 105' for cage windings (not shown). A two-pole stator having punched-out laminations 106 is disposed inside the rotor, which also has coils 107, 107' and an auxiliary coil 108 for capacitor operation. The inner stator 100 ensure that the motor starts running to a predetermined direction of rotation. The rotor 104 runs up to high speed under the control of the inner stator 100. Also, the inner stator 100 can be briefly energized to produce a low starting torque in cases in which the meander winding 104 is energized immediately afterwards, in which event the short circuit windings on the pole 102, 102' can be omitted.

In another embodiment, the arms 103' can be at a greater distance from the armature than the arms 103, thus ensuring that the motor starting torque is operative in the required direction without the starting method just described having to be used.

Figure 10:
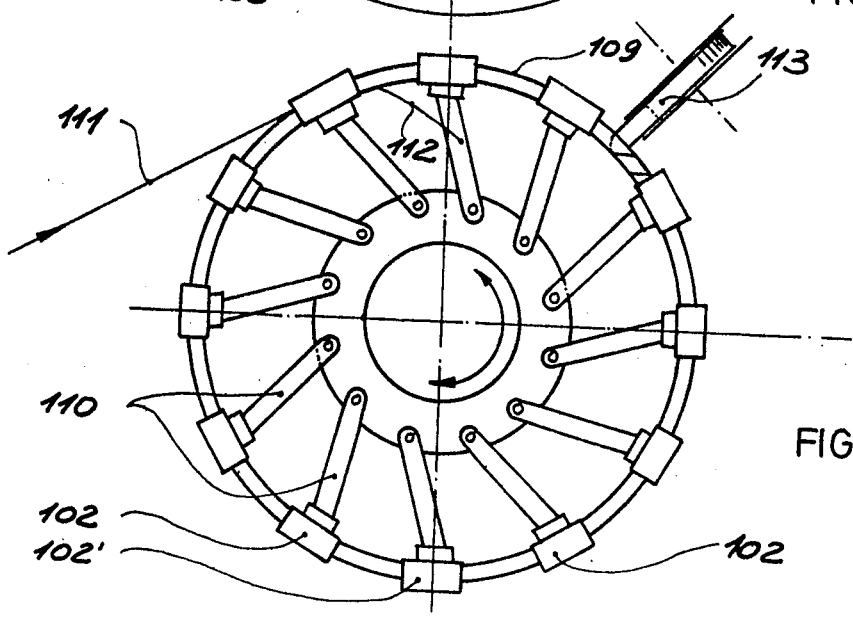
FIG. 10 is a diagrammatic view of an apparatus in which the winding is wound into the pole-forming elements according to the invention before the pole ring is made up, whereafter the poles are pivoted to give the winding the meandering shape and the pole ring is made up simultaneously.

FIG. 10 is a diagrammatic view of a winding arrangement for the meander coil of the outer stator 101 of FIG. 9. The horseshoe elements 102, 102' from which the poles are formed are secured to the ends of spokes 110 of a rotating device, the horseshoe apertures facing outwards, whereafter the apparatus is rotated to wind copper wire 111 into the pole channels; the wire start 112 can be secured to a spoke 110. After completion of the coil the insulated 113 is applied. To move the coil 109 relatively to the horseshoe elements 102, 102', the spokes 110 together with the elements 102, 102' experience rotary oscillations such that, although the spoke wheel does not rotate around its axis, the coil 109 rotates slowly in the elements 102, 102'. After the coil 109 has been bandaged, the spoke wheel is released from the horseshoe elements and the same are taken up by an apparatus of the kind described with reference to FIGS. 5a and 5b and are so rotated that the coil 109 is given a meandering shape and simultaneously the elements 102, 102' are combined to form a pole ring.

Figure 11A:
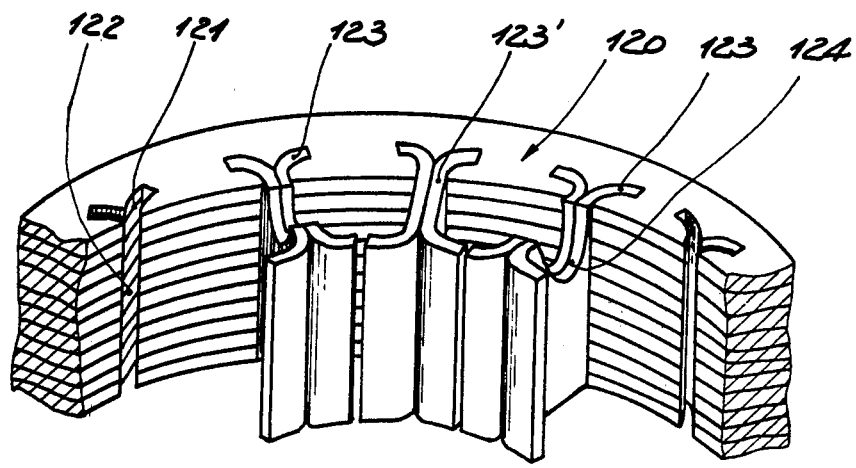
FIGS. 11a to 11c are perspective views showing portions of annular soft-iron cores according to the invention produced from metal strips.

FIG. 11a shows part of a pole ring whose pole-piece return 120 forming the shunt takes the form of a coil of laminated iron. The coil is punched out with recesses 121 forming grooves 122 for insertion of poles 123. Each pole comprises two rectangular laminations bent in the manner shown. The poles 123 are slid into grooves 122 before the meander coil is introduced, whereas the poles 123' are introduced into the core 120 after insertion of the meander coil (not shown). Recesses 124 are disposed at different ends of adjacent poles 123, 123' and receive the meander coil heads.

Figures 11B, 11C:
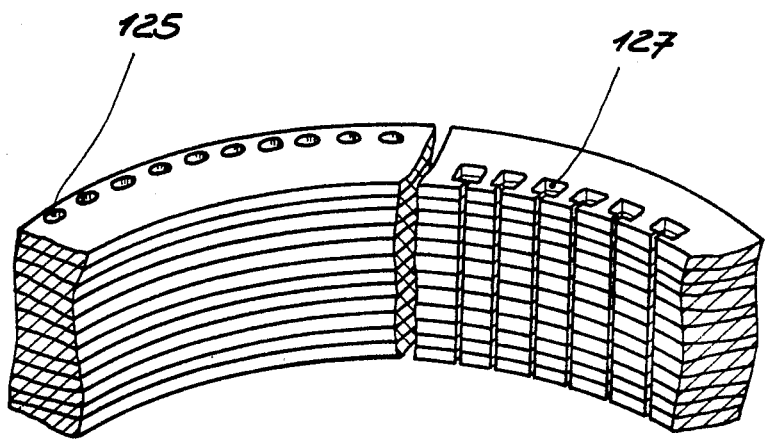

FIG. 11b shows part of a hollow cylindrical lamination group; the metal strips from which the group 120' is formed have holes 125 punched in them to form channels into which a cage winding of an armature is cast. In the embodiment shown in FIG. 11c there are grooves 127 for receiving conventional windings in the lamination group 120''.

Figure 12:
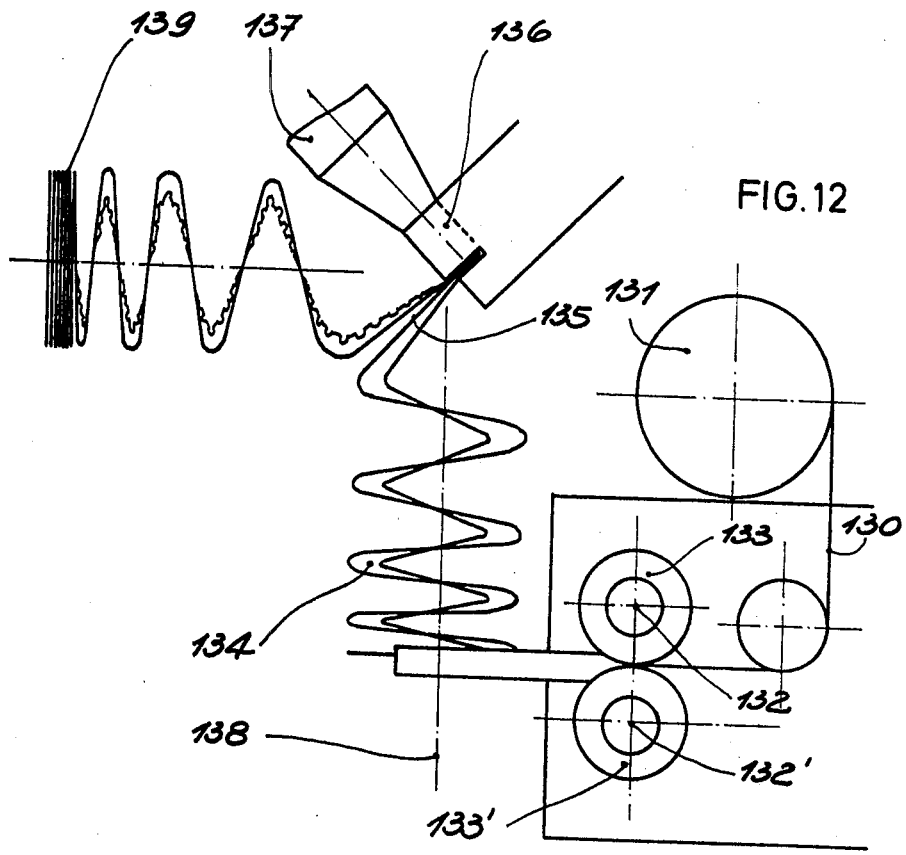
FIG. 12 is a diagrammatic view of an apparatus for producing annular soft-iron cores from metal strip.

FIG. 12 shows the basic construction of an apparatus for coiling a metal strip 130 drawn off a reel 131. Axes 132, 132' of steel rolls 133, 133' include between them an angle such that a strip of metal passing through the roll nip is shaped to form a coil 134 in the manner shown. The coil 134 is deflected through a right-angle at a point 135, where there is a rotating punch 136 which punches the recesses or the like 121, 125, 127 in the coiled strip. The punch axis extends at an angle of about 45° to the axes of the coil bent at a right-angle so that the coil can be punched out at the place shown. The punched coil is then laminated after the fashion of a lamination group 139, and when the group 139 has reached the required length it is cut off.

Figure 13A:
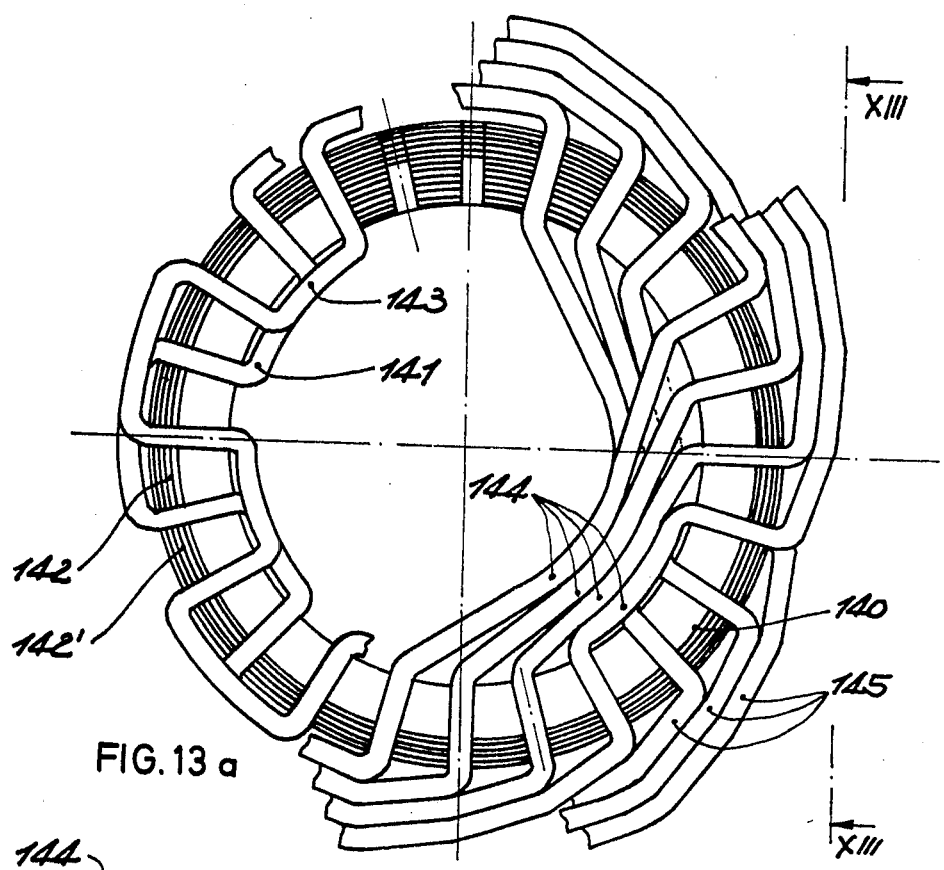
FIG. 13a is a plan view of the stator of an axial split-casing motor having a number of meandering component coils according to the invention.
Figure 14:
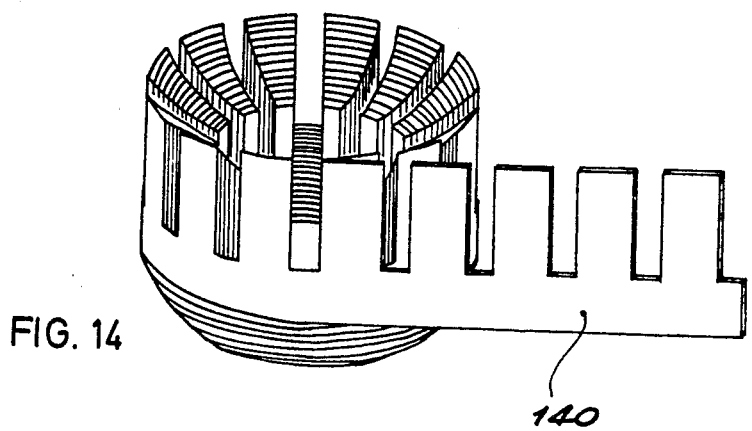
FIG. 14 shows how the soft-iron core of the rotor shown in FIG. 13a is wound.

FIG. 13a is a plan view of the stator of an axial airgap motor whose iron core is produced by the spiral winding of a metal strip 140 in the manner shown in FIG. 14.

Figure 13B:
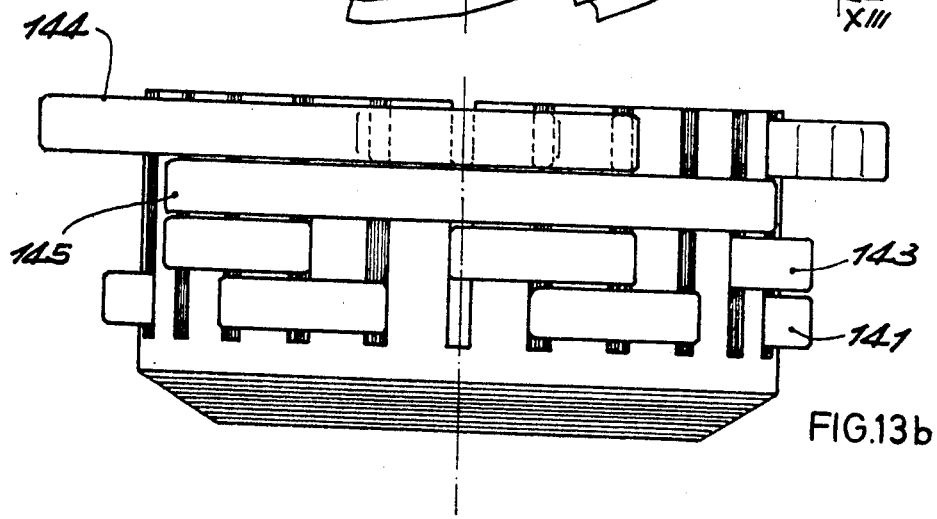

FIG. 13b is a view of the stator along the line XIII—XIII of FIG. 13a. As can be seen, a meander winding 141 is disposed in the bottom position and extends around two poles 142, 142'. In the layer above is an auxiliary winding 143 which experiences a phase shift by having a capacitor connected in parallel with it. In the next layers are further meander coils 144, 145, to the number of 4 in each layer, which are introduced in the manner shown and form a four-pole motor, so that the pole ring shown forms, in association with an axial split-casing motor, a pole-changing motor adapted to run at choice on four or 12 poles.

I claim:

1. A multiple-pole rotary electrical machine having a rotor part and a stator part with an airgap therebetween wherein at least one part comprises a soft iron core having poles extending toward said airgap and a winding extending axially of said core; the improvement comprising in that each pole is a separate unit adapted to be joined with an adjacent unit by being pushed together axially with respect to the core whereby all of the units together form a pole ring in which every other pole is identical and in that the axial length of said winding does not exceed the axial length of said units when said units are pushed together to form a pole ring, where each said pole comprises two groups of a plurality of rectangular laminations with each lamination being curved into a horseshoe shape and where the laminations of one group are curved in one direction and the laminations of the other group are curved in an opposite direction, wherein one end of one group of laminations is adjacent an end of the other group of laminations to form a pole shoe wherein all of the laminations extend axially of the core and where the ends of a group of laminations opposite from the ends forming a pole shoe are overlapped to join with overlapped ends of a group of laminations of an adjacent pole.

2. A multiple pole rotary electrical machine according to claim 1 in which the overlapped ends are staggered relative to one another whereby when one pole is joined with an adjacent pole, the staggered ends of a group of laminations of one pole will engage with the staggered ends of a group of laminations of an adjacent pole.

3. A multiple-pole rotary electrical machine having a rotor part and a stator part with an airgap therebetween wherein at least one part comprises a soft iron core having poles extending towards said air gap and a winding extending axially of the core; the improvement comprising in that each pole comprises a plurality of laminations forming a separate unit adapted to be joined with an adjacent unit by being pushed together axially with respect to the core whereby all of the units together form a pole ring in which every other pole is identical and in that the axial length of said winding is equal to the axial length of said units when said units are pushed together to form a pole ring.

4. A multiple-pole rotary electrical machine according to claim 3 characterized in that each said pole comprises two groups of a plurality of rectangular laminations with each lamination being curved into a horseshoe shape and where the laminations of one group are curved in one direction and the laminations of the other group are curved in an opposite direction and wherein one end of one group of laminations is adjacent an end of the other group of laminations to form a pole shoe and wherein all the laminations extend axially of the core.

5. A multiple-pole rotary electrical machine according to claim 3 characterized in that each said pole comprises two groups of a plurality of rectangular laminations with each said lamination being curved into a horseshoe shape wherein one of the ends of the horseshoe of one group of laminations forms a half of a pole shoe and one of the ends of the horseshoe of the other group of laminations forms the other half of the pole shoe and wherein all the laminations extend axially of the core.

6. A multiple-pole rotary electrical machine according to claim 3 wherein said machine is a split field motor having a short circuit ring extending around some of the ends of the laminations which form the pole shoe.

7. A multiple-pole rotary electrical machine according to claim 3 wherein each said pole comprises a plurality of laminations extending in a radial direction with respect to said core with a portion of each lamination being punched out to form a part of a pole.

8. A multiple-pole rotary electrical machine according to claim 7 characterized in that said laminations are bent in an axial direction with respect to said core whereby recesses are formed on one axial end of a group of said laminations forming a pole into which a portion of a coil may fit.